(12) United States Patent
Zanstra

(10) Patent No.: US 8,951,421 B2
(45) Date of Patent: Feb. 10, 2015

(54) APPARATUS AND METHOD FOR PURIFYING A LIQUID

(75) Inventor: Geert Jan Zanstra, Dearsum (NL)

(73) Assignee: Convex B.V., Sneek (NL)

( * ) Notice: Subject to any disclaimer, the term of this patent is extended or adjusted under 35 U.S.C. 154(b) by 760 days.

(21) Appl. No.: 13/254,710

(22) PCT Filed: Mar. 2, 2010

(86) PCT No.: PCT/NL2010/050104
§ 371 (c)(1),
(2), (4) Date: Oct. 18, 2011

(87) PCT Pub. No.: WO2010/101459
PCT Pub. Date: Sep. 10, 2010

(65) Prior Publication Data
US 2012/0037489 A1 Feb. 16, 2012

(30) Foreign Application Priority Data
Mar. 2, 2009 (NL) ...................................... 1036652

(51) Int. Cl.
*B01D 1/28* (2006.01)
*B04C 5/20* (2006.01)
(Continued)

(52) U.S. Cl.
CPC ... *B01D 1/22* (2013.01); *B04C 5/20* (2013.01); *B01D 19/0063* (2013.01); *B04C 7/00* (2013.01);
(Continued)

(58) Field of Classification Search
CPC ...... B01D 1/28; B01D 1/2856; B01D 1/0064; B01D 1/0094; B01D 1/065; B01D 1/12; B01D 1/22; B01D 1/2818; B01D 1/305; B01D 5/0039; B01D 5/006; B01D 19/0057; B01D 19/0094; B01D 19/0063; B04C 3/02; B04C 3/06; B04C 5/14; B04C 5/20; B04C 7/00; B04C 9/00; B04C 11/00; B04C 5/28; B04C 5/30; B04C 2009/008; B04C 2003/006; B04C 2009/002; B04C 2009/004; B04C 5/04

USPC ............ 210/167.32, 175, 180, 181, 787–790, 210/512.1, 512.2; 202/182, 177, 180; 203/24, 40, DIG. 14; 159/24.1, 24.3, 159/6.1, 24.2, 28.1, DIG. 25
See application file for complete search history.

(56) References Cited

U.S. PATENT DOCUMENTS 2,033,471 A 3/1936 Keenan
2,295,101 A * 9/1942 Dunham ....................... 55/459.5
(Continued)

FOREIGN PATENT DOCUMENTS

DE 103 25 230 A1 12/2004
GB 816400 A 7/1959
(Continued)

OTHER PUBLICATIONS

Leaflet: GEA Wiegand GmbH, "Evaporation Technology using Mechanical Vapour Recompression," pp. 1-23, GEA Process Engineering Division, (May 2003).
(Continued)

*Primary Examiner* — David C Mellon
(74) *Attorney, Agent, or Firm* — Kilpatrick Townsend & Stockton LLP

(57) ABSTRACT

For purifying a liquid, the liquid is caused to evaporate in a cyclone in a recirculation circuit. Vapor is discharged via a discharge channel in which a compressor is included. In a heat exchanger downstream of the compressor, supplied vapor condenses and heat thereby released is transferred to liquid in the recirculation circuit. A liquid inlet of the cyclone is placed and directed for delivering a jet having a directional component tangential with respect to an inner surface of the cyclone. The liquid inlet has a section shaped such that in operation the delivered jet is a flat jet having a cross section which in a direction parallel to a nearest generatrix of the inner surface of the cyclone is greater than in a direction perpendicular thereto. The jet contacts the inner surface of the cyclone before drop formation occurs in the jet. A method for purifying a liquid is also described.

7 Claims, 4 Drawing Sheets

(51) Int. Cl.
  *B04C 9/00* (2006.01)
  *B01D 1/22* (2006.01)
  *B01D 19/00* (2006.01)
  *B04C 7/00* (2006.01)
  *B01D 1/00* (2006.01)
  *B04C 5/04* (2006.01)

(52) U.S. Cl.
  CPC .............. *B01D 19/0094* (2013.01); *B04C 9/00* (2013.01); *B01D 1/2856* (2013.01); *Y10S 203/14* (2013.01); *B01D 1/0082* (2013.01); *B01D 1/28* (2013.01); *B01D 19/0057* (2013.01); *B04C 5/04* (2013.01); *Y10S 203/16* (2013.01)
  USPC ........ 210/788; 210/180; 210/181; 210/512.1; 210/167.32; 202/182; 203/24; 203/40; 203/DIG. 14; 159/24.3; 159/6.1; 159/28.1; 203/DIG. 13

(56) References Cited

U.S. PATENT DOCUMENTS

| | | | | |
|---|---|---|---|---|
| 2,786,546 | A | * | 3/1957 | McMillin ....................... 96/209 |
| 3,724,674 | A | * | 4/1973 | Loison ....................... 210/512.1 |
| 4,424,770 | A | * | 1/1984 | Yamazaki et al. ............. 122/488 |
| 5,587,054 | A | * | 12/1996 | Keith ............................. 202/182 |
| 5,766,412 | A | * | 6/1998 | Railey .......................... 159/47.3 |
| 5,771,844 | A | | 6/1998 | Dietz |
| 6,355,145 | B1 | | 3/2002 | Kresnyak et al. |
| 6,365,005 | B1 | | 4/2002 | Schleiffarth |
| 8,366,802 | B2 | * | 2/2013 | Olsson ............................... 95/1 |
| 2001/0045162 | A1 | * | 11/2001 | McQuigg et al. ............... 95/218 |
| 2002/0112998 | A1 | | 8/2002 | Bosman |
| 2005/0126394 | A1 | | 6/2005 | Reiling |
| 2006/0130449 | A1 | * | 6/2006 | Han et al. ......................... 55/452 |
| 2009/0010721 | A1 | | 1/2009 | Albrecht |
| 2013/0098850 | A1 | * | 4/2013 | Wolf .............................. 210/787 |

FOREIGN PATENT DOCUMENTS

| | | |
|---|---|---|
| GB | 822675 A | 10/1959 |
| GB | 2 439 528 A | 1/2008 |

OTHER PUBLICATIONS

Examination Report mailed Sep. 6, 2012, from European Application No. 10706799.3 (5 pages).
Intention to Grant mailed Mar. 24, 2014, from European Application No. 10706799.3 (6 pages).

* cited by examiner

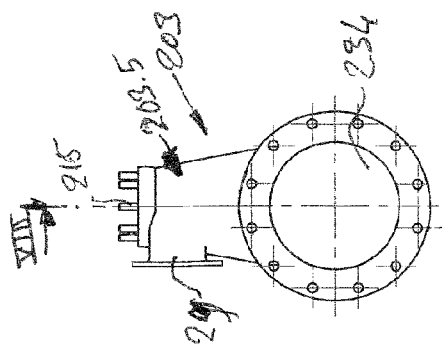
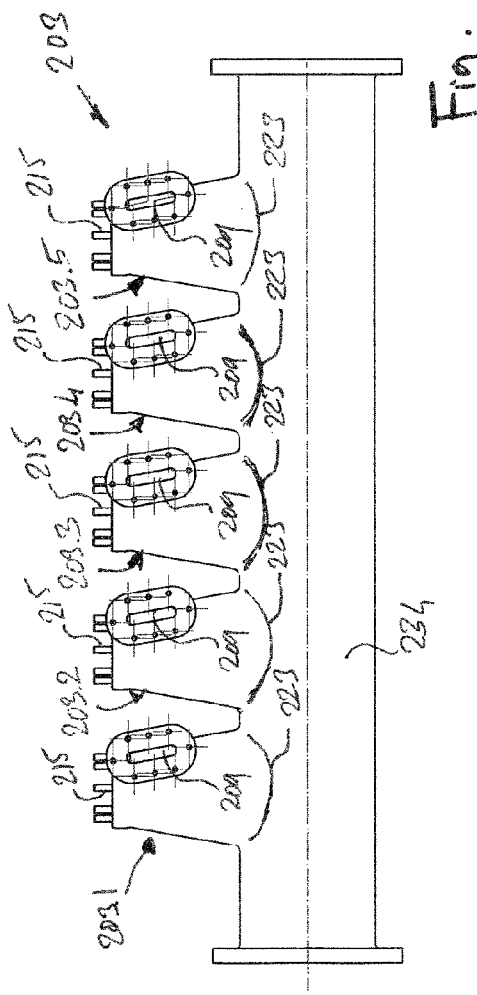
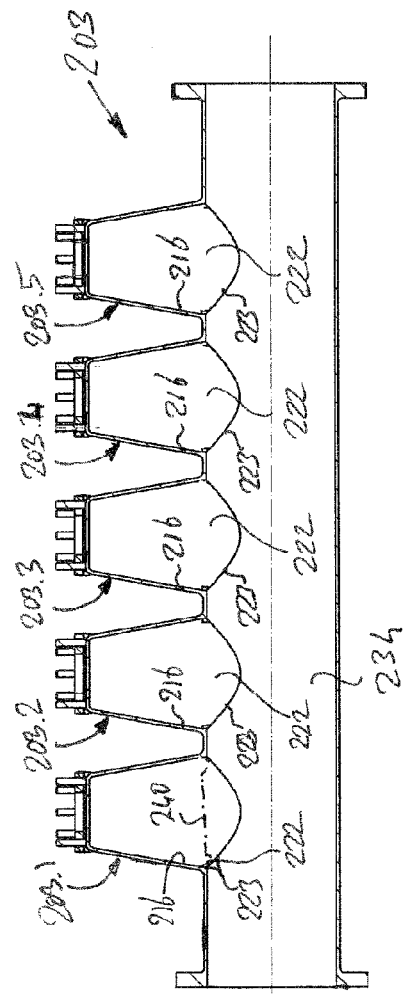

APPARATUS AND METHOD FOR PURIFYING A LIQUID

CROSS-REFERENCES TO RELATED APPLICATIONS

This application is a National Stage of International Application No. PCT/NL2010/050104, filed Mar. 2, 2010, and which claims the benefit of Netherlands Patent Application No. 1036652, filed Mar. 2, 2009, the disclosures of which are incorporated herein by reference.

FIELD AND BACKGROUND OF THE INVENTION

The invention relates to a method and an apparatus for purifying a liquid by evaporation and with compression of the vapor.

It is quite well known to remove substances from a supplied starting liquid by allowing the liquid to evaporate and allowing the liquid to condense without the constituents to be separated from the starting liquid and collecting it. The evaporation can be promoted by heating the liquid. The non-evaporated liquid can be discharged or be recirculated. This last is generally attractive in processes where the starting liquid cannot be simply drained and is evaporated to a limited volume in which the unwanted constituents occur in a relatively high concentration. If the liquid after evaporation is hotter than the initial temperature prior to heating of the liquid as supplied, recirculation moreover enables a utilization of the remainder of heat supplied to the liquid, left after evaporation.

By compressing the captured vapor, it is heated and the dew point of the air and the vapor included therein is shifted to a higher temperature. By thereupon passing the air-with-vapor adjusted to an increased pressure through a heat exchanger through which, separately from the air and the vapor, also the recirculated liquid is passed, a heat flow to the recirculated liquid is created. This is particularly effective for recovering the energy introduced with compression, because a large portion of the vapor condenses in the heat exchanger, thereby releasing heat with which the recirculating liquid is heated. Optionally, in a second step, residual heat may be transferred to supplied liquid, so that it is preheated before being supplied to the recirculation circuit.

The evaporation of liquid can take place, for example, in the heat exchanger, which is simple and favorable to the efficiency, because the cooling action of the evaporation contributes to the heat flow through the heat exchanger.

A disadvantage of evaporation in the heat exchanger is that upon evaporation aerosols are formed which are entrained when capturing the vapor. Contained in the aerosols are constituents of the starting liquid that need to be separated in purifying the liquid. This means that the purification of the liquid halts at an incomplete level. Moreover, such entrained impurities entail pollution and hence diminishing performance of the heat exchanger.

An improvement can be achieved when for an effective separation of liquid and vapor evaporation is done in a cyclone. The liquid is then jetted into a cyclone, within which a portion of the liquid evaporates. From U.S. Pat. No. 6,365,005, for example, it is known to drive rotation of the liquid in the cyclone by introducing supplied liquid tangentially below the liquid level in the cyclone. For achieving a high efficiency and a high production capacity, however, an intensive evaporation is desirable. An intensive evaporation in the cyclone has been found still to entail an unwanted extent of pollution of the evaporated and condensed liquid.

SUMMARY OF THE INVENTION

It is an object of the invention to offer a solution to the problems of too high a content of impurities in the purified liquid and pollution of the heat exchanger if the liquid to be purified is caused to evaporate in the cyclone with high intensity.

This object is achieved according to a first aspect of the invention by providing a method for purifying a liquid, including:

in a recirculation circuit recirculating the liquid through a cyclone, wherein the liquid flows over an inner surface of a circumferential wall of the cyclone, a portion of the liquid evaporates and is discharged via a vapor outlet which extends through an upper wall of the cyclone and another portion of the liquid is discharged through a liquid outlet in a lower end of the cyclone;

compressing the discharged evaporated portion of the liquid;

causing a portion of the discharged evaporated portion of the liquid to condense; and causing heat released in the condensing of the said portion of the discharged evaporated portion of the liquid to be transferred to the liquid which is recirculated in the recirculation circuit.

In this method, the liquid is introduced from a liquid inlet into the cyclone in form of a liquid jet having a directional component tangential with respect to a portion of the inner surface of the circumferential wall of the cyclone that is situated closest to the liquid inlet. The liquid jet is a flat jet with a cross section which in a direction parallel to a nearest generatrix of the inner surface of the circumferential wall of the cyclone has a greater dimension than in a direction perpendicular thereto. Speed, location, orientation and shape of the liquid jet are such that it contacts the inner surface of the circumferential wall of the cyclone without drop formation occurring in the jet. Temperature of the liquid in the liquid jet and pressure in the cyclone are such that in the liquid no boiling occurs. The liquid flows in a helical line over the inner surface of the circumferential wall of the cyclone.

By ensuring that the delivered jet is flat and has a cross section which in a direction parallel to a nearest generatrix of the inner surface of the circumferential wall of the cyclone has a greater dimension than in a direction perpendicular thereto and/or the speed, location, orientation and shape of the delivered jet are such that the delivered jet contacts the inner surface of the circumferential wall of the cyclone without drop formation occurring in the jet, the possibility is prevented that fine drops are released and these drops or, after evaporation of the liquid of the drops, constituents to be separated from the liquid that are present in the drops, can be entrained with the vapor out of the cyclone.

Both the flat configuration of the jet and the liquid flowing along a helical line over the inner surface of the circumferential wall then enable an intensive evaporation from the liquid, in that the liquid has a relatively large surface exposed to air. The cooling action of the intensive evaporation moreover ensures that boiling phenomena as a result of a pressure drop in the hot liquid upon egress from the inlet are prevented. The liquid can therefore egress from the inlet at a relatively low pressure and/or with a relatively high temperature.

Particular embodiments of the invention are laid down in the depending claims.

These and other aspects as well as effects and details connected with the invention are described below, with reference to the accompanying drawings.

BRIEF DESCRIPTION OF THE DRAWINGS

FIG. 6 is a side elevation of an example of a multiple cyclone assembly of an apparatus according to the invention;

FIG. 7 is a frontal view of the multiple cyclone assembly according to FIG. 6; and FIG. 8 is a side elevational view in cross section along the line VIII-VIII in FIG. 7.

DETAILED DESCRIPTION

Figure 1:
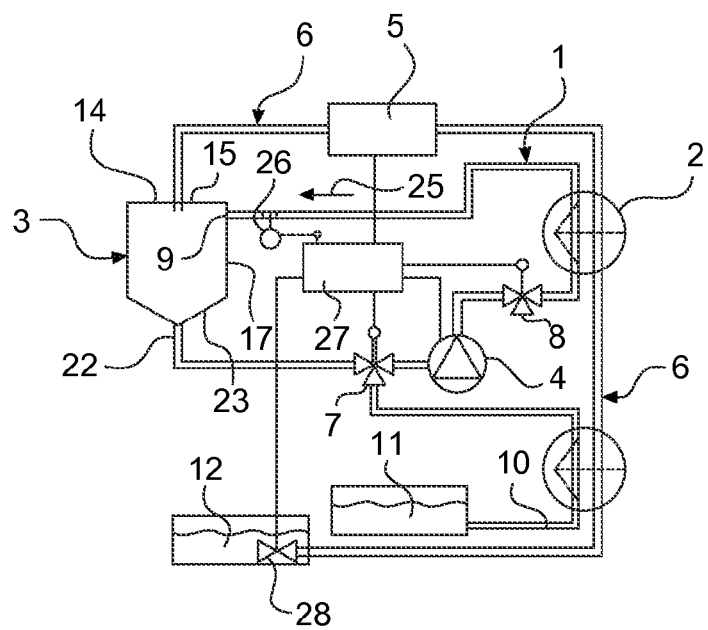
FIG. 1 is a process-technical representation of an example of an apparatus according to the invention.
Figure 2:
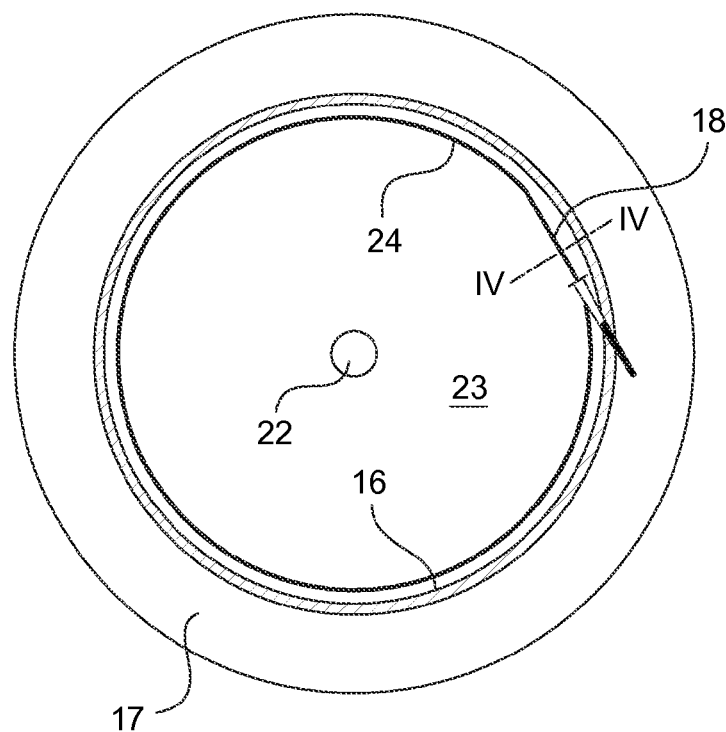
FIG. 2 is a top plan view in cross section of a first example of a cyclone of an apparatus according to the invention near an upper end thereof.
Figure 3:
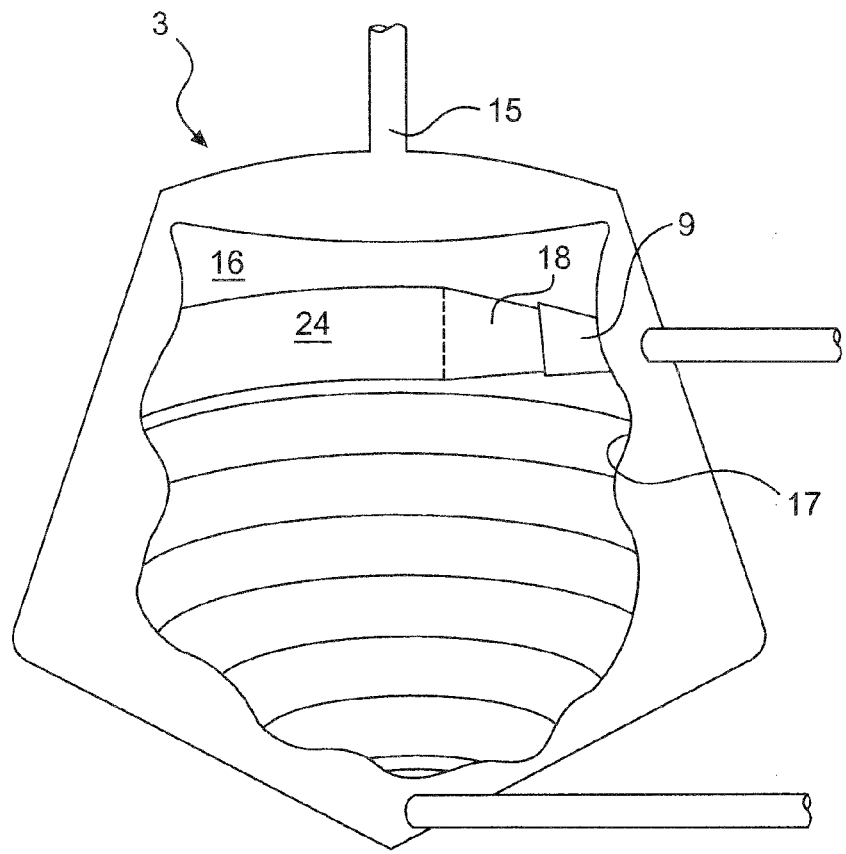
FIG. 3 is a cutaway perspective view of the cyclone according to FIG. 2.
Figure 4:
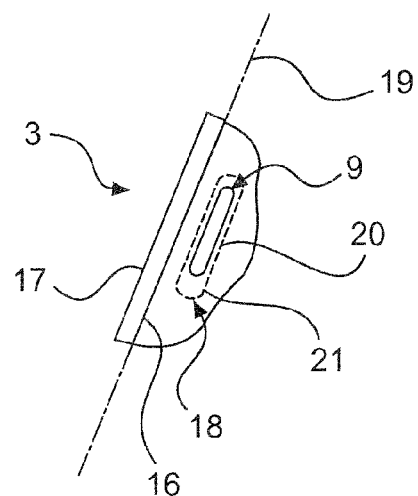
FIG. 4 is an elevational view in cross section along the line IV-IV in FIG. 2 of a portion of a cyclone.
Figure 5:
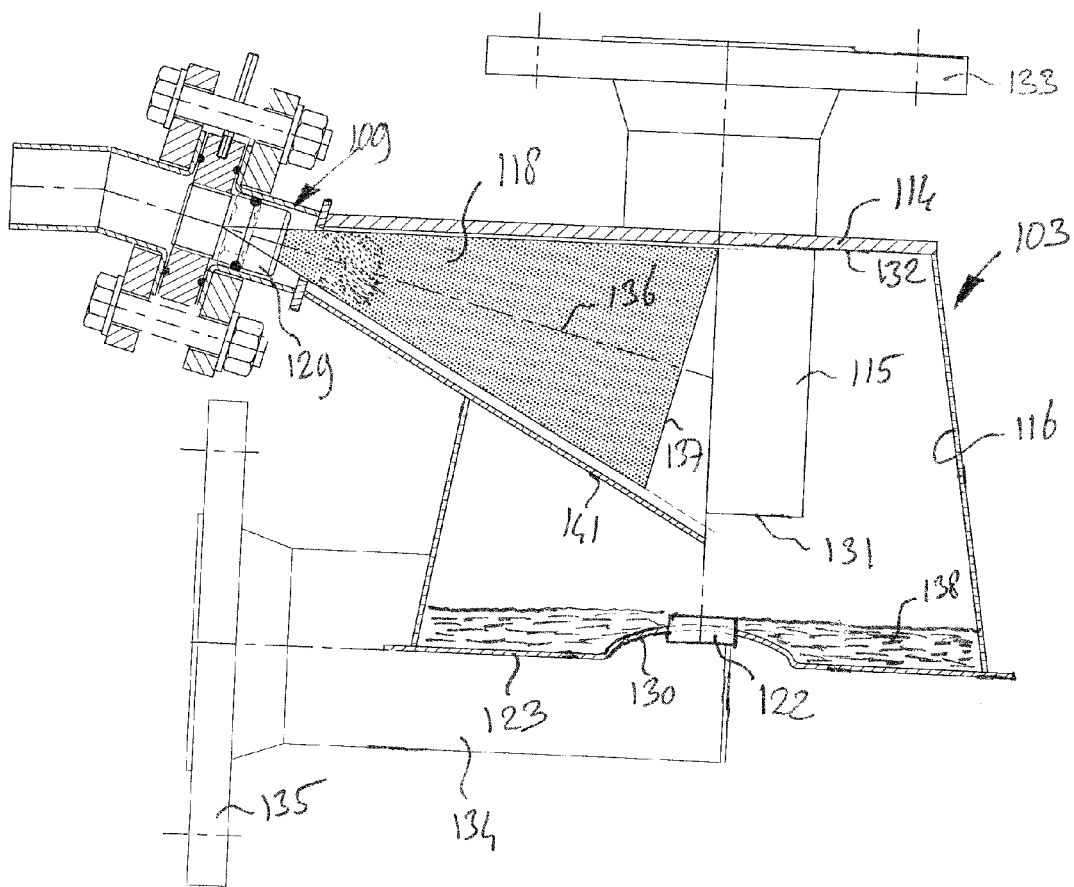
FIG. 5 is a cutaway side elevational view of a second example of a cyclone of an apparatus according to the invention.

In FIGS. 1-4 there is shown an example of an apparatus according to the invention for purifying a liquid.

The apparatus has a recirculation circuit 1 in which a pump 4 is included. For letting liquid to be purified into the recirculation circuit 1, it is equipped with a liquid inlet 7. For tapping residue from the recirculation circuit 1, a residue tapping outlet 8 is provided. Via the residue tapping outlet 8, liquid can be tapped from the recirculation circuit 1, for example, when the concentration in the recirculation circuit 1 of substances that are to be separated from the starting liquid becomes too high or when a switch is to be made to the purification of liquids having a different composition. A vapor outlet 15 of the recirculation circuit 1 serves to allow evaporated liquid to escape from the recirculation circuit 1.

In circulation direction (arrow 25) the recirculation circuit 1 runs from the pump 4 through a heat exchanger 2 and through a cyclone 3.

For the supply of liquid, a supply channel 10 is connected to the recirculation circuit 1 via the liquid inlet 7. The supply channel 10 extends from a reservoir 11 in which liquid is contained in which occur one or more constituents of which the liquid is to be purified.

For carrying off vapor, a discharge channel 6 is connected to the recirculation circuit 1 via the vapor outlet 15. Included in the discharge channel 6 is a compressor 5 for generating an excess pressure in a portion of the discharge channel 6 downstream of the compressor 5. Downstream of the heat exchanger 2, the discharge channel includes a restriction 28, so that an excess pressure can be built up in at least a portion of the discharge channel 6 where the heat exchanger 2 is situated. In operation, the compressor 5 compresses air and vapor coming from the cyclone 3, so that the pressure in the portion of the discharge channel 6 downstream of the compressor 5 is higher than upstream of the compressor 5. The compression ratio may be, for example, 1.5-2. A portion of the discharge channel 6 downstream of the compressor 5 runs through the heat exchanger 2. By increasing the pressure, also the temperature of the air and the vapor rises upon passing the compressor 5 (substantially adiabatic compression).

By means of the heat exchanger 2, which is also included in the recirculation circuit 1, the temperature of the air-vapor mixture is reduced again through heat transfer from the discharge channel 6 to the recirculation circuit 1. As the vapor thereby condenses for a large part, the energy deployed for causing the vapor to evaporate is recovered in an effective manner.

According to this example, the restriction 28 is of regulable design in the form of a throttle valve. Moreover, the restriction 28 is provided at a downstream end of the discharge channel 6 and placed in a reservoir 12 where the condensed liquid is collected. As a result of the decompression of the air-vapor mixture, it cools strongly at the restriction 28. As the restriction is placed in the reservoir, heat can be rapidly supplied via the liquid to prevent freezing phenomena occurring in or at the restriction 28. If it is desirable to take measures to prevent freezing phenomena, however, it is also possible that the restriction, which may be placed in or outside the liquid in the reservoir 12, is distributed over a longer path, or to use multiple restrictions to have decompression take place in steps.

The recirculation circuit 1 runs from the heat exchanger 2 through a liquid inlet 9 of the cyclone 3 and a liquid outlet 22 at a lower end of the cyclone 3, in this example in the bottom 23 of the cyclone 3. The vapor outlet 15 extends through an upper wall 14 of the cyclone 3. By the pump 4 liquid is recirculated through the recirculation circuit 1 in the direction indicated with the arrow 25. The liquid heated in the heat exchanger 2 then flows to the cyclone 3 into which the liquid is jetted at a level above a lower end and any liquid level in the cyclone, so that a jet 18 and a liquid stream downstream thereof move through air in the cyclone 3, allowing evaporation from them to occur. The liquid inlet 9 of the cyclone 3 is placed and directed such that in operation the jet 18 has a directional component tangential with respect to a portion of an inner surface 16 of a circumferential wall 17 of the cyclone 3 that is situated closest to the liquid inlet 9. As a result, the liquid moves along a helical line from the liquid inlet 9 to the liquid outlet 22 of the cyclone 3. A relatively large surface of the heated liquid is then exposed to the air, so that an important portion of the liquid evaporates in the cyclone and is discharged via the vapor outlet 15. As the liquid rotates in the cyclone 3, it is effectively separated from the vapor, so that relatively little of the pollution is carried along with the vapor and reaches the heat exchanger 2.

For a good utilization of the capacity of the cyclone 3, however, it is desirable to jet relatively hot liquid finely divided into the cyclone 3 at a relatively low pressure with a high flow rate. In thus raising the capacity, the extent to which pollution reaches the heat exchanger 2 has been found to increase and reach values that make it unattractive to further augment the processing capacity.

The liquid inlet 9 has a cross section 20 which is so shaped that in operation the delivered jet is a flat jet 18 with a cross section 21 which in a direction parallel to a nearest generatrix 19 of the inner surface 16 of the circumferential wall 17 of the cyclone 3 has a greater dimension than in a direction perpendicular thereto. What is thus achieved is that a large surface of the liquid is exposed to the air, so that the liquid evaporates rapidly. Moreover, due to the cooling thereby induced, any boiling phenomena are prevented, also after the pressure drop upon exiting from the inlet 9. Moreover, heat transfer to the surface of the jet 18, due to the slight thickness thereof, needs to bridge only a short distance, so that an intensive heat transfer to the surface of the liquid where the evaporation takes place is enabled. Moreover, due to the flat shape of the jet 18, having a largest width approximately in a direction parallel to the nearest generatrix 19 of the inner wall surface 16 of the cyclone 3, the jet 18 can easily without splashing deflect from the point where it reaches the inner wall surface 16 of the cyclone 3.

The flat shape of the jet 18, especially in liquid processing with process parameters tuned to a high evaporation capacity, thus prevents the formation of fine drops in which or from which pollution can be entrained with the vapor flow. This makes it possible to achieve a high evaporation capacity while at the same time entrainment of pollution is relatively limited, or at a given evaporation capacity to limit or practically eliminate the entrainment of pollution.

The extent to which the jet 18 is flat can be expressed as a ratio between the largest dimension and the smallest dimension of the cross section 21 of the liquid jet 18. This ratio is preferably at least 3:1 and more particularly at least 4:1 or 5:1.

For the control of the apparatus, it is equipped with a control 27 which is coupled with the pump 4, the compressor 5, the inlet valve 7, the residue outlet valve 8, a sensor assembly 26 for measuring the pressure and the temperature in the recirculation circuit 1 upstream of and near the liquid inlet 9, as well as the throttle valve 28. Regulating the compressor 5 and the throttle valve 28 then makes it possible to influence the temperature in the discharge channel 6 downstream of the compressor 5, and hence the extent to which the liquid in the recirculation circuit is heated via the heat exchanger 2. By regulating the compressor 5, the inlet valve 7 and the residue outlet valve 8, the pressure in the recirculation circuit 1 can be regulated. By means of the sensor assembly 26, it can be measured whether the pressure and temperature of the liquid in the recirculation circuit 1 are such that the boiling point of the liquid is approached or exceeded, while possibly taking account of flow phenomena and pressure drop occurring if the liquid exits from the liquid inlet 9. It is also possible, however, to detect the occurrence of boiling phenomena on the basis of concomitant flow phenomena and/or acoustic phenomena.

The temperature of the liquid in the jet 18 and the pressure in the cyclone 3 are preferably so regulated that no boiling occurs in the liquid. In this way, too, the release of aerosols is prevented.

According to another aspect of the invention, the formation of fine drops in which or from which substances to be removed from the starting liquid may be entrained as aerosols with the vapor flow, is prevented by providing that the pump 4 and the liquid inlet 9 are so arranged that in operation the delivered jet 18 contacts the inner surface 16 of the circumferential wall 17 of the cyclone 3 before drop formation occurs in the jet 18.

The liquid thus reaches the inner surface 16 of the circumferential wall 17 of the cyclone 3 without drop formation occurring in the cyclone 3, and flows along a spiral path 24 or at least a spiral pattern to the liquid outlet 22. The liquid thus rotates in the cyclone 3 without liquid drops, or constituents to be removed that originate therefrom, floating through the inner space of the cyclone 3 from where they could be carried along with the vapor to be discharged. By this measure too, the vapor yield of the cyclone 3 can be enlarged and/or the extent to which pollution is carried along through the discharge channel 6 can be limited.

Also in this context it is advantageous if the liquid inlet 9 is placed and directed such that the jet 18 there where it contacts the inner surface 16 of the circumferential wall 17 of the cyclone 3 is deflected without splashing to form the liquid stream 24 which flows along a helical line over the inner surface 16 of the circumferential wall 17 of the cyclone 3.

The apparatus according to the example shown is equipped with a further heat exchanger 13, through which run the discharge channel 6 and the supply channel 10 for heat exchange between the discharge channel 6 and the supply channel 10. The relatively low temperature of the liquid supplied makes it possible to absorb residual heat present in the vapor and the condensed liquid in the discharge channel 6 after having passed the first heat exchanger 2.

In FIG. 5 there is shown a second example of a cyclone 103 of an apparatus according to the invention. The cyclone 103 has a liquid inlet 109 with a nozzle 129 and a liquid outlet 122 in an elevation 130 in the bottom 123 of the cyclone 103. The vapor outlet 115 is designed as a channel with an inlet 131 spaced from the upper end of the inner space of the cyclone 103. The channel 115 extends through the upper wall 114 of the cyclone 103 and is provided with a flange 133 for coupling to a further conduit. The liquid outlet 122 terminates in a recirculation channel 134 with a flange 135 for coupling to further conduits. The nozzle 129 is arranged for delivering a jet 118 whose vertical dimension increases in a direction away from the nozzle 129. As the jet 118 has an increasing largest dimension transverse to the longitudinal direction thereof, a jet with a large outer surface can be realized with a relatively small nozzle. This is advantageous for promoting evaporation of the liquid and hence the cooling thereof, so that boiling phenomena and aerosol formation thereby induced are prevented. As the jet 118 extends along the outer side of the vapor outlet channel 115, of which the inlet is situated lower than the inlet 109, the possibility is prevented that any splashes and aerosols released from the jet 118 reach the inlet 131 of the vapor discharge channel 115 and are carried along to the heat exchanger.

Under a centerline 136 of the nozzle 109 extends a screen plate 141 which in operation extends below the jet 118, so that the jet 118 is downwardly screened off as far as the point 137 where it contacts the inner wall 116 of the cyclone 103. By virtue of the screening 141 of the portion of the jet upstream of the point 137 where the jet contacts the inner wall 116 of the cyclone 103, there is further prevented a possibility that as a result of initial boiling phenomena and atomization liquid can reach the inlet 131 of the vapor discharge channel 131. For this purpose it is further advantageous that the point 137 where jet 118 contacts the inner wall 116 of the cyclone 103 is located higher than the downwardly directed inlet opening 116 of the vapor discharge channel 115.

As the location of liquid outlet 122 is elevated with respect to the bottom 123 of the cyclone 103, there is in operation a layer of liquid 138 at the bottom of the cyclone 103. From this layer, also, evaporation can proceed. As this liquid 138, as a result of the liquid already evaporated therefrom, is relatively cool and flows relatively slowly, it can be present opposite the inlet 131 of the vapor discharge channel 115 without this resulting in substantial contribution to aerosol being entrained via the vapor discharge channel.

In FIGS. 6, 7 and 8 there is shown a multiple design of a cyclone assembly 203 for an apparatus according to the invention. According to this example, the multiple cyclone assembly 203 is composed of five cyclones 203.1, 203.2, 203.3, 203.4 and 203.5. Each cyclone 203.1, 203.2, 203.3, 203.4 and 203.5 has an inlet 209 and a vapor discharge passage 215. Lower ends 223 of these cyclones 203.1, 203.2, 203.3, 203.4 and 203.5 join a wall of a liquid discharge channel 234. Such a construction permits modular adaptation of the cyclone to the required capacity and results in a relatively slender construction, so that a cyclone with a large capacity can be transported relatively easily and does not need to be assembled on site under less well controlled conditions.

The liquid discharge passages 222 of the cyclones 203.1, 203.2, 203.3, 203.4 and 203.5 are formed by cyclone lower ends 223 which are open along inner walls 216 of the cyclones 203.1, 203.2, 203.3, 203.4 and 203.5. Liquid can thus flow away distributed along a large inner surface of the liquid discharge channel 234, so that evaporation from the liquid is promoted also after exiting from the cyclones 203.1, 203.2, 203.3, 203.4 and 203.5. Optionally, a screen 240 (see chain-dotted line in cyclone 203.1 in FIG. 8) may be mounted under each cyclone 203.1, 203.2, 203.3, 203.4 and 203.5 or in a lower portion of each cyclone 203.1, 203.2, 203.3, 203.4 and 203.5, leaving clear an annular discharge passage along the inner wall of the cyclone 203.1, 203.2, 203.3, 203.4 and 203.5. Such screen plates 240 can prevent the possibility that aerosols, as a result of liquid freely falling down in the discharge channel 234, are entrained to the vapor discharge 215.

The invention claimed is:

1. A method for purifying a liquid, comprising:
   in a recirculation circuit recirculating the liquid through a cyclone, wherein the liquid flows over an inner surface of a circumferential wall of the cyclone, a portion of the liquid evaporates and is discharged via a vapor outlet which extends through an upper wall of the cyclone and another portion of the liquid is discharged through a liquid outlet in a lower end of the cyclone;
   compressing the discharged evaporated portion of the liquid;
   causing a portion of the discharged evaporated portion of the liquid to condense; and
   causing heat released in the condensing of the portion of the discharged evaporated portion of the liquid to be transferred to the liquid which is recirculated in the recirculation circuit;
   wherein the liquid is introduced from a liquid inlet into the cyclone in form of a liquid jet having a directional component tangential with respect to a portion of the inner surface of the circumferential wall of the cyclone that is situated closest to the liquid inlet;
   wherein the liquid jet is a flat jet with a cross section which in a direction parallel to a nearest generatrix of the inner surface of the circumferential wall of the cyclone has a greater dimension than in a direction perpendicular thereto;
   wherein speed, location, orientation and shape of the liquid jet are such that it contacts the inner surface of the circumferential wall of the cyclone without drop formation occurring in the jet;
   wherein temperature of the liquid in the liquid jet and pressure in cyclone are such that in the liquid no boiling occurs; and
   wherein the liquid flows in a helical line over the inner surface of the circumferential wall of the cyclone.

2. A method according to claim 1, wherein the cross section of the liquid jet has a largest dimension and a smallest dimension, the largest dimension being at least three times as large as the smallest dimension.

3. A method according to claim 1, wherein the liquid jet, where it contacts the inner surface of the circumferential wall of the cyclone, is deflected without splashing to form a liquid stream which flows along a helical line over the inner surface of the circumferential wall of the cyclone.

4. A method according to claim 1, wherein the liquid jet, from the inlet, has an increasing largest dimension transverse to a longitudinal direction of the liquid jet.

5. A method according to claim 1, wherein the liquid jet extends along an outer side of a vapor discharge channel forming the vapor outlet, of which vapor discharge channel an inlet is situated lower than the liquid inlet.

6. A method according to claim 1, wherein the liquid jet,. upstream of a point where it contacts the inner surface of the circumferential wall of the cyclone extends above and along a screen.

7. A method according to claim 1, wherein the liquid jet contacts the inner surface of the circumferential wall of the cyclone at a point which is situated higher than a downwardly facing inlet opening of a vapor discharge channel forming the vapor outlet.

* * * * *